United States Patent
Lee et al.

(10) Patent No.: US 11,260,879 B2
(45) Date of Patent: Mar. 1, 2022

(54) VEHICLE AND METHOD FOR CONTROLLING THE SAME

(71) Applicants: Hyundai Motor Company, Seoul (KR); Kia Motors Corporation, Seoul (KR)

(72) Inventors: Jinmo Lee, Gyeonggi-do (KR); Kaangdok Yee, Gyeonggi-do (KR); Jung Keun You, Gyeonggi-do (KR); Joongkwan Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/693,238

(22) Filed: Nov. 23, 2019

(65) Prior Publication Data

US 2020/0216093 A1 Jul. 9, 2020

(30) Foreign Application Priority Data

Jan. 7, 2019 (KR) .................. 10-2019-0001743

(51) Int. Cl.
*B60W 50/16* (2020.01)
*B60W 10/30* (2006.01)
*G06K 9/00* (2006.01)
*B60W 40/08* (2012.01)

(52) U.S. Cl.
CPC .......... *B60W 50/16* (2013.01); *B60W 10/30* (2013.01); *G06K 9/00315* (2013.01); *B60W 2040/0818* (2013.01); *B60W 2040/0872* (2013.01); *B60W 2540/22* (2013.01); *B60W 2710/30* (2013.01)

(58) Field of Classification Search
CPC . B60W 2040/0818; B60W 2040/0827; B60W 2040/0836; B60W 2040/0854; B60W 2040/0863; B60W 2040/0872
USPC .................. 340/576, 539.1, 539.12, 683
See application file for complete search history.

(56) References Cited

U.S. PATENT DOCUMENTS

| | | | |
|---|---|---|---|
| 2014/0218187 A1* | 8/2014 | Chun | A61B 5/18 340/439 |
| 2015/0206523 A1* | 7/2015 | Song | G10H 1/0008 84/609 |
| 2015/0254955 A1* | 9/2015 | Fields | G08B 21/02 705/4 |
| 2015/0297109 A1* | 10/2015 | Garten | A61B 5/375 600/544 |
| 2016/0001781 A1* | 1/2016 | Fung | G16H 50/20 701/36 |

(Continued)

OTHER PUBLICATIONS

Molecular Vibration Wikipedia, Accessed Dec. 15, 2020.*

(Continued)

*Primary Examiner* — Daniel Previl
(74) *Attorney, Agent, or Firm* — Mintz Levin Cohn Ferris Glovsky and Popeo, P.C.; Peter F. Corless

(57) ABSTRACT

A vehicle is provided that includes a bio-signal sensor configured to measure a bio-signal of a user and a feedback device configured to interact with the bio-signal of the user. A controller determines a current emotional state of the user based on the bio-signal and adjusts an output signal of the feedback device based on the current emotional state. The output signal leads to a target emotional state in which the degree of excitability is a reduced emotional state.

16 Claims, 10 Drawing Sheets

(56) References Cited

U.S. PATENT DOCUMENTS

2016/0046294 A1* 2/2016 Lee .................. G06F 3/016
340/576
2019/0357834 A1* 11/2019 Aarts .................. G08B 21/06

OTHER PUBLICATIONS

Introduction to Vibrations, Accessed Dec. 15, 2020.*
Speed of Sound, Frequency, and Wavelength, Acessed Dec. 15, 2020.*
Paredes, et al. "Just breathe: In-Car Interventions for Guided Slow Breathing", Proceedings of the ACM on Interactive, Mobile, Wearable and Ubiquitous Technologies, vol. 2, No. 1, Article 28, Mar. 2018.
Fleur D. Yen Pik Sang, et al., "Behavioral Methods of Alleviating Motion Sickness: Effectiveness of Controlled Breathing and a Music Audiotape", J Travel Med 2003; 10: 108-111.
Yu et al., "Design and Evaluation of an Ambient Lighting Interface of HRV Biofeedback System in Home Setting", R. Hervás et al. (Eds.): UCAmI 2014, LNCS 8867, pp. 88-91, 2014.
Costa, et al., "EmotionCheck: Leveraging Bodily Signals and False Feedback to Regulate our Emotions", UbiComp 16, Sep. 12-16, 2016, Heidelberg, Germany.

* cited by examiner

| EXPRESSION\EMOTION FACTOR | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| EXPRESSION 1 | .65 | .87 | .35 | .88 | .14 | | | | .63 | .53 | | | | | .33 |
| EXPRESSION 2 | .01 | 0.09 | .11 | | .54 | | .31 | .51 | .61 | | | | | | .97 |
| EXPRESSION 3 | .70 | | .90 | | .19 | .87 | | | | | | | | | |

VEHICLE AND METHOD FOR CONTROLLING THE SAME

CROSS-REFERENCE TO RELATED APPLICATION(S)

This application is based on and claims priority under 35 U.S.C. § 119 to Korean Patent Application No. 10-2019-0001743, filed on Jan. 7, 2019, the disclosure of which is incorporated by reference in its entirety.

TECHNICAL FIELD

The present disclosure relates to a vehicle and a control method thereof, and more specifically, to a vehicle capable of interacting between a driver's bio-signal and a feedback device and a control method thereof.

BACKGROUND

A vehicle being developed may provide useful services to users with the vehicle by detecting the emotion of the user and providing various types of feedback devices that may reflect the emotion. However, technology developed thus far does not consider the delicate emotions of the user since the emotions of the user in the vehicle is determined to be positive or negative, and only the output results based thereon is provided. Meanwhile, the vehicle has various devices capable of interacting with the user.

SUMMARY

Therefore, it is an aspect of the present disclosure to provide a vehicle having a feedback device sensing a bio-signal of a user and influencing a state of the user, and a control method thereof.

In accordance with an aspect of the present disclosure, a vehicle may include a bio-signal sensor configured to measure a bio-signal of a user; a feedback device configured to interact with the bio-signal of the user; and a controller configured to: determine a current emotional state of the user based on the bio-signal and adjust an output signal of the feedback device based on the current emotional state. The output signal leads to a target emotional state in which a degree of excitability is a reduced emotional state.

The bio-signal sensor may be configured to sense at least one of a breathing state and a heartbeat state of the user. The controller may be configured to operate the feedback device to generate the output signal having an output frequency matched with a frequency of the bio-signal. The feedback device may be a vibration device disposed on a seat of the vehicle and the controller may be configured to adjust the output frequency to determine a vibration period of the vibration device. The feedback device may also be a speaker mounted within the vehicle and the controller may be configured to adjust the output frequency to determine a sound period of the speaker.

Alternately, the feedback device may be a lighting device mounted within the vehicle and the controller may be configured to adjust the output frequency to determine a light emission period of the lighting device. The controller may be configured to adjust the output of a guide frequency for guiding an output frequency matched with a frequency of the bio-signal to a target frequency. The target frequency is a frequency of the emotional state in which the degree of excitability of the user is reduced.

The bio-signal sensor may be configured to detect a heartbeat state and a breathing state of the user. Additionally, the feedback device may include a vibration device, a speaker, a display or a lighting device mounted within the vehicle. The controller may be configured to operate at least one of the vibration device, the speaker, the display or the lighting device by adjusting the guide frequency, and lead the heartbeat state and the breathing state of the user. In particular, the feedback device may be a speaker mounted within the vehicle and the controller may be configured to adjust the guide frequency to determine a sound period of the speaker. The feedback device may also be a speaker mounted within the vehicle and the controller may be configured to simultaneously output a first sound based on the target frequency and a second sound based on the guide frequency.

The vehicle may further include a display interlocked with the speaker and the display may be configured to output a first image and a second image. The first image may be an image based on the target frequency and the second image may be an image based on the guide frequency. Additionally, the feedback device may be a lighting device mounted within the vehicle and the controller may be configured to adjust the guide frequency to determine a light emission period of the lighting device. The feedback device may include at least one of the speaker, the display, an air conditioner, the vibration device, and the lighting device. The vehicle may further include a camera configured to acquire image data for the user. The controller may be configured to determine the current emotional state of the user based on at least one of the image data and the bio-signal of the user.

In accordance with another aspect of the present disclosure, a method may include obtaining a bio-signal of a user by a bio-signal sensor; determining a type of an output signal of a feedback device to interact with the bio-signal of the user, and a current emotional state of the user based on the bio-signal; adjusting the output signal of the feedback device based on the current emotional state; and outputting the output signal by the feedback device. The output signal leads to a target emotional state in which a degree of excitability is a reduced emotional state.

The adjusting of the output signal may include operating the feedback device to generate the output signal having an output frequency matched with a frequency of the bio-signal. The vehicle comprising the feedback device may be a vibration device disposed on a seat of the vehicle and the output frequency may be adjusted to determine a vibration period of the vibration device. The vehicle comprising the feedback device may also be a speaker mounted within the vehicle and the output frequency may be adjusted to determine a sound period of the speaker.

Further, the vehicle comprising the feedback device may be a lighting device mounted within the vehicle and the output frequency may be adjusted to determine a light emission period of the lighting device. The adjusting of the output signal may include adjusting the output of a guide frequency for guiding an output frequency matched with a frequency of the bio-signal to a target frequency. The target frequency is a frequency of the emotional state in which the degree of excitability of the user is reduced. The vehicle comprising the feedback device may be a vibration device within the vehicle and the guide frequency may be adjusted to determine a vibration period of the vibration device.

In addition, the vehicle comprising the feedback device may be a speaker mounted within the vehicle and the guide frequency may be adjusted to determine a sound period of the speaker. The vehicle may further include a display interlocked with a speaker. The adjusting of the output signal may include operating the display of a first image and a second image. The first image may be an image based on the target frequency and the second image may be an image based on the guide frequency. The vehicle comprising the feedback device may be a lighting device in the vehicle and the guide frequency may be adjusted to determine a light emission period of the lighting device.

The vehicle comprising the feedback device may include at least one of a speaker, a display, an air conditioner, a vibration device, and a lighting device. The vehicle may further include a camera configured to acquire image data for the user. The obtaining of a bio-signal of the user by the bio-signal sensor may include determining the current emotional state of the user based on at least one of the image data and the bio-signal of the user. According to an aspect of the present disclosure, it may be possible to provide a feedback device that alleviates stress on the user by interacting with the user in the vehicle.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
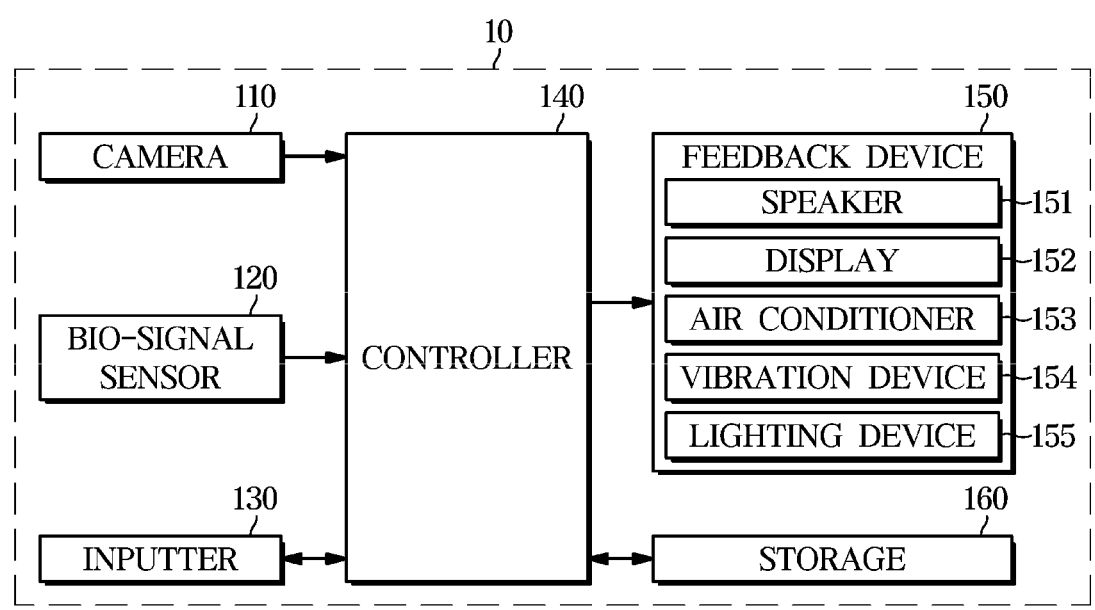
FIG. 1 is a control block diagram of a vehicle according to an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numbers refer to like elements throughout this specification. This specification does not describe all components of the exemplary embodiments, and general information in the technical field to which the disclosure belongs or overlapping information between the embodiments will not be described.

It will be understood that when a component is referred to as being "connected" to another component, it can be directly or indirectly connected to the other component. When a component is indirectly connected to another component, it may be connected to the other component through a wireless communication network.

As used herein, the terms "portion," "unit," "block," "member," or "module" refers to a unit that can perform at least one function or operation. For example, these terms may refer to at least one process which is performed by at least one piece of hardware such as a field-programmable gate array (FPGA) and an application specific integrated circuit (ASIC), or at least one piece of software stored in a memory, or a processor. Reference numerals used in operations are provided for convenience of description, without describing the order of the operations, and the operations can be executed in a different order from the stated order unless a specific order is definitely specified in the context.

Hereinafter, exemplary embodiments of a vehicle according to an aspect and a method of controlling the vehicle will be described in detail with reference to the accompanying drawings. FIG. 1 is a control block diagram of a vehicle according to an exemplary embodiment of the disclosure.

Referring to FIG. 1, a vehicle 10 according to an exemplary embodiment of the disclosure may include a camera 110 configured to capture an image of a user entering the vehicle 10 and obtain image data of the user, a bio-signal sensor 120 configured to measure a bio-signal of the user, an inputter 130 configured to receive an input from the user, a controller 140 configured to determine the user's current emotional state based on at least one of the image data of the user or the bio-signal and determine an operation ratio between a first mode for operating a feedback device 150 to decrease a degree of excitability of the user and a second mode for operating the feedback device 150 to increase a degree of positivity of the user based on a difference value between the determined current emotional state and a target emotional state. The feedback device 150 may be mounted within the vehicle 10 to output feedback that causes the user's emotion to be a target emotion under the operation of the controller 140, and a storage 160 may be configured to store various information required for operation of the vehicle 10.

The camera 110 (e.g., video camera, or other similar imaging device) may be configured to capture an image of the user in the vehicle 10 to obtain the image data of the user. The image data of the user may include information regarding the user's facial expression, i.e., a motion of a facial composition. The camera 110 may include a plurality of lenses and an image sensor. The image sensor may include a plurality of photodiodes for converting light into electrical signals, and the plurality of photodiodes may be arranged in a two-dimensional matrix. In addition, the camera 110 may be an infrared camera for capturing the user during night driving. Additionally, the image data of the user may include information regarding the user's facial expression.

The camera 110 may be installed on a dashboard, a windshield or a seat of the vehicle 10. However, there is no limitation on the installation position and number of the camera 110. The image data of the user, obtained by the camera 110, may be used by the controller 140 to identify the user's facial expression and the user's position. Therefore, the camera 110 may be installed in front of the user.

The user may include both a driver and a passenger of the vehicle 10. The camera 110 may be configured to obtain the image data of each of the users in the vehicle 10. The bio-signal sensor 120 according to an exemplary embodiment of the disclosure may be configured to measure the bio-signals of each of the users in the vehicle 10. The bio-signals of the user may be transmitted to the controller 140 and stored in the storage 160. The bio-signal sensor 120 may be installed at various positions in the vehicle 10. For example, the bio-signal sensor 120 may be disposed on the seat, a seat belt, a steering wheel, and a handle provided on a door.

In addition, the bio-signal sensor 120 may be provided as a type of wearable device that the user entering the vehicle 10 may wear. The bio-signal sensor 120 may include at least one of a galvanic skin response (GSR) sensor configured to measure skin electrical conductivity based on a sweat rate of the user, a skin temperature sensor configured to measure a skin temperature of the user, a heart rate (HR) sensor configured to measure a heart rate of the user, an electroencephalogram (EEG) sensor configured to measure brainwaves of the user, a voice recognition sensor configured to measure a voice signal of the user, a blood pressure measurement sensor configured to measure a blood pressure of the user, or an eye tracker configured to track the positions of pupils. However, sensors that may be included in the bio-signal sensor 120 are not limited to the above-mentioned sensors, and the bio-signal sensor 120 may include another sensor capable of measuring a person's bio-signal.

The inputter 130 may be configured to receive an input from the user. Specifically, the inputter 130 may be configured to receive an input of a target emotional state, an input to the feedback device 150, and an input of a mode switching pattern from the user. Accordingly, the inputter 130 may be disposed in a center fascia (not shown) installed in the center of a dashboard and may be implemented with mechanical buttons, knobs, a touch pad, a touch screen, a stick-type manipulation device, a trackball, or the like. The inputter 130 disposed on the touch screen may be provided on a display 152 provided inside the vehicle 10. However, the position and implementation method of the inputter 130 are not limited to the above-described example, and may be included without limitation as long as the position and the implementation method of the user's input may be received.

The controller 140 according to an exemplary embodiment of the disclosure may be configured to determine the user's current emotional state based on at least one of the image data of the user or the bio-signals, and operate the feedback device 150 based on the determined current emotional state. Particularly, the controller 140 may be configured to determine a facial expression of the user based on the image data of the user, and obtain information regarding the emotional state that corresponds to the facial expression. A configuration for obtaining information regarding the user's emotional state based on the image data will be described in detail later.

In addition, the controller 140 may be configured to obtain information regarding the emotional state that corresponds to the bio-signals of the user based on the bio-signals of the user. A configuration for obtaining information regarding the user's emotional state based on the bio-signals will be described in detail, later. In particular, the controller 140 may be configured to operate the feedback device 150 in a direction in which the degree of excitability of the user is reduced. The controller 140 may also be configured to determine a difference value between the current emotional state and the target emotional state of the user determined based on at least one of the image data and the bio-signals of the user. The target emotional state may be set in advance in a design stage of the vehicle 10, or may be set based on the user's input through the inputter 130.

The difference value between the current emotional state and the target emotional state of the user includes the difference value for the excitability and the difference value for the positivity. In other words, the controller 140 may be configured to compare the degree of excitability and the degree of positivity of the target emotional state, respectively, based on the determined degree of excitability and the determined degree of positivity, and determine the difference value and the difference value of the degree of positivity with respect to the degree of excitability.

The controller 140 may be configured to adjust the output of a guide frequency having a constant value to reach the current emotional state of the user to the target emotional state. In addition, the guide frequency may have a constant value, but it may have a variable value that changes gradually. The feedback device 150 may include at least one of a speaker 151, the display 152, an air conditioner 153 mounted within the vehicle 10, a vibration device 154 disposed in the seat of the vehicle 10, and a lighting device 155 provided in the seat of the vehicle 10.

The speaker 151 may be configured to output a sound having a target frequency that corresponds to a target breathing period or a target heartbeat period and may be operated the controller 140. The speaker 151 may also be configured to output a first sound having the target breathing period or the target heartbeat period based on the target frequency and a second sound based on a guide frequency leading the target frequency to an output frequency that matches the user's bio-signal frequency. For example, the first sound may be background music that corresponds to the target breathing period or the target heartbeat period, and the second sound may correspond to a natural sound or the like, which induces the second sound to correspond to the background music. In particular, the intensity of the output of the first sound and the second sound or the band of an acoustic frequency may be distinguished. Therefore, acoustic interference between the first sound and the second sound may be avoided.

In other words, the controller 140 may be configured to set each of the breathing period and the heartbeat period having the target emotional state as the target breathing period and the target heartbeat period, and the controller 140 may be configured to operate the speaker 151 to output sound that corresponds to the target breathing period or the target heartbeat period in the vehicle 10 and thus, the degree of excitability of the user may be reduced. Accordingly, the vehicle 10 may cause the user's breathing period to be induced to the target breathing period or the user's heartbeat period to be led to the target heartbeat period. Accordingly, the speaker 151 may be provided inside the vehicle 10, and may be provided without limitation as long as it is a position where the sound of the user of the vehicle 10 may be heard.

Additionally, the display 152 may be configured to output an image that reduces the emotion factor that corresponds to the degree of excitability, based on the operation of the controller 140. The controller 140 may be configured to set a color to reduce the emotion factor that corresponds to the degree of excitability, and set the color in the design stage. Additionally, the controller 140 may be configured to set the color based on the correlation information between the color and the emotion factor acquired from an external server, and may be set by the user. Accordingly, the display 152 may be provided within the vehicle 10 and may include a panel. For example, the display 152 may be provided in a cluster, provided across the cluster and the center fascia, or provided in a ceiling or the door inside the vehicle 10.

The panel may be at least one of a cathode ray tube (CRT) panel, a liquid crystal display (LCD) panel, a light emitting diode (LED) panel, an organic light emitting diode (OLED) panel, a plasma display panel (PDP), and a field emission display (FED) panel. The position and number of the displays 152 may be included without limitation as long as the position and number of the information may be visually transmitted to the user of the vehicle 10.

Figure 7:
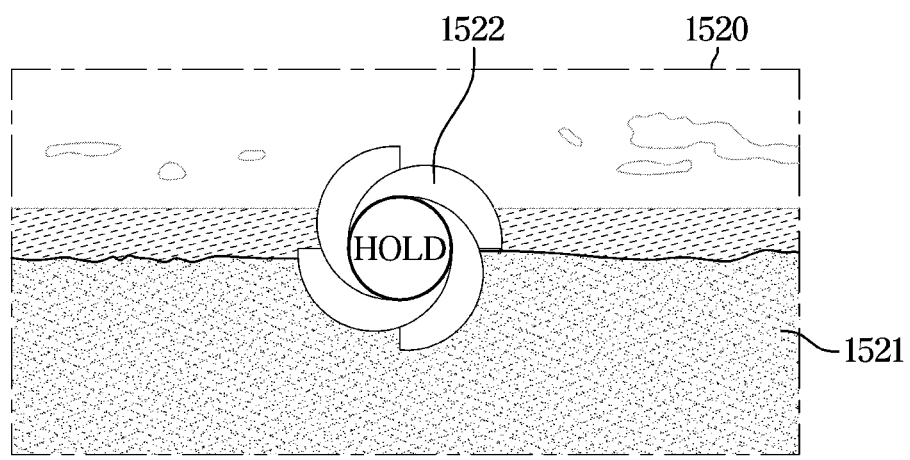
FIG. 7 is a view of an output screen of a display referred to in one exemplary embodiment.

Referring to FIG. 7, an output image of the display 152 according to one exemplary embodiment may be confirmed. An output image 1520 of the display 152 may provide a first image 1521 and a second image 1522 simultaneously. Particularly, the first image 1521 may correspond to a target frequency corresponding to the target breathing period or the target heartbeat period described above, and the second image 1522 may correspond to a target frequency corresponding to a target frequency and may correspond to a guide frequency leading to a frequency, the first image 1521 may be a calm sea background image and the second image 1522 may be a shape that stabilizes the user's emotions by a moving pattern.

Figure 8:
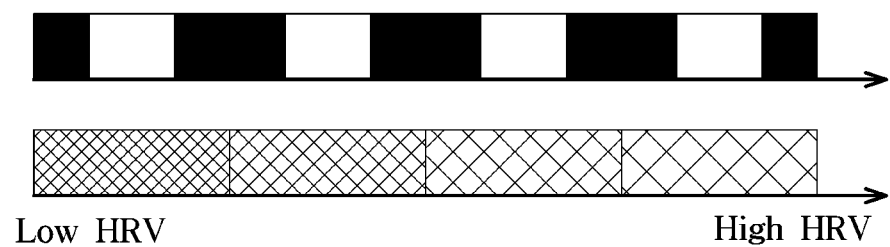
FIG. 8 is an emotional state according to visual feedback in an exemplary embodiment.

Further FIG. 8 shows that a Heart Rate Variability (HRV) is relaxed according to the visual feedback. The factors influencing the visual feedback may include the intensity of light and the color of light. Accordingly, the emotion of the user may be visually derived, and the emotion of the user may be changed by the visually derived image. The vibration device 154 may be operated by the controller 140 to output a vibration having a frequency that corresponds to the target breathing period or the target heartbeat period.

Figure 9:
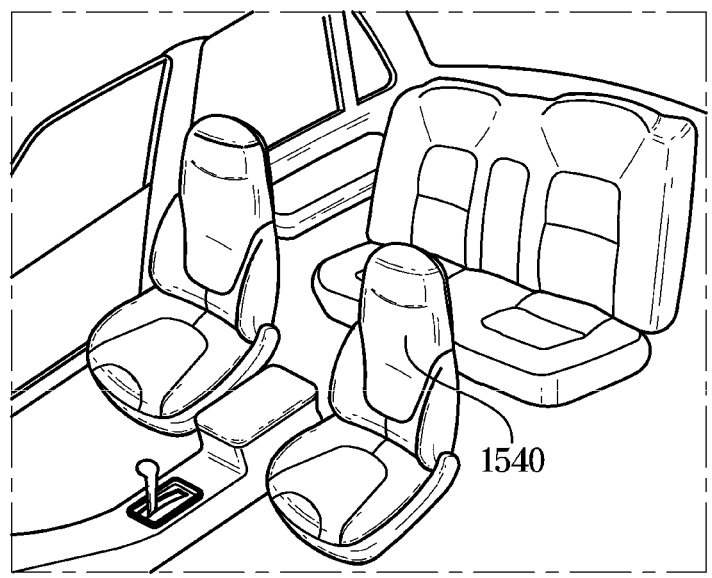
FIG. 9 shows an example of a vibration device which is referred to in one exemplary embodiment.

The vibration causes a seat 1540 provided inside the vehicle 10 to vibrate, as shown in FIG. 9, and the vibration may be transmitted to the user located on the seat through the seat 1540. Therefore, the vibration device 154 may be provided inside the seat within the vehicle 10, and may correspond to a motor driven under the operation of the controller 140. The vibration device 154 may be configured to rotate to correspond to the frequency received from the controller 140 and transmit the vibration that corresponds to the frequency to the user on the seat.

Further, according to the exemplary embodiment, the vibration device 154 may further include a vibration plate configured to amplify the vibration. According to the operation of the controller 140, the air conditioner 153 may be configured to output at least one of a perfume and wind that reduce the emotion factor corresponding to the degree of excitability.

In particular, the perfume and wind that decreases the emotion factor corresponding to the degree of excitability may be set when the vehicle 10 is designed, may be set by the controller 140 based on the correlation information between the perfume and the emotion factor obtained from the external server, and may be set by the user through the inputter 130. For example, the perfume and wind that decrease the emotion factor corresponding to the degree of excitability may correspond to jasmine perfume and a breeze, respectively. However, the present disclosure is not limited thereto, and any perfume that may decrease the emotion factor corresponding to the degree of excitability may be included without limitation. In addition, the wind that decreases the emotion factor corresponding to the degree of excitability may correspond to the wind having at least one of wind direction, intensity, and temperature that can lower the degree of excitability.

Accordingly, the air conditioner 153 may be mounted within the vehicle 10 and operated by the controller 140 to blow wind (e.g., warm air or cool air) to the indoor space of the vehicle 10. More particularly, the air conditioner 153 may include a compressor, a condenser, an expansion valve, and a heat exchanger, and the compressor, the condenser, the expansion valve, and the heat exchanger may be connected to each other through at least one refrigerant passage. A refrigerant may flow through the compressor, the condenser, the expansion valve, and the heat exchanger along the refrigerant passage, and the air conditioner 153 may obtain cold air or warm air based on a change in the state of the flowing refrigerant. The cold air or warm air may be provided to the indoor space of the vehicle 10 through a fan.

The air conditioner 153 may include a motor configured to drive the fan that generates wind blowing into the indoor space of the vehicle 10, and may also include a motor configured to adjust a wing member (not shown) provided in air vents 141 to adjust a direction of the blowing wind. In addition, the air conditioner 153 may include a fragrance actuator configured to spray a fragrance substance in the wind blown into the indoor space, and the fragrance actuator may include a plurality of storage tanks in which various types of the fragrance substances may be stored, and a motor configured to inject the fragrance substance through the injection port.

Furthermore, the lighting device 155 may be operated by the controller 140 to emit light inside the vehicle 10 with a period corresponding to the target breathing period or the target heartbeat period. Specifically, the brightness or a light emission period of the lighting device 155 may be changed. In particular, the lighting device 155 may include an interior light mounted on the ceiling of the vehicle 10, the door (not shown) of the vehicle 10, or ambient lighting or the like installed for aesthetic purposes on a part of the dashboard.

The controller 140 may be configured to operate at least one of the speaker 151, the display 152, the vibration device 154, the air conditioner 153, and the lighting device 155 corresponding to the feedback device 150 to induce a positive emotion of the user and decrease the degree of excitability of the user. The controller 140 may include at least one memory for storing a program for performing the above-described operations and operations to be described later, and at least one processor for executing the stored program. When there are a plurality of the memories and processors, they may be integrated on one chip or provided in physically separated positions.

The storage 160 according to one exemplary embodiment may be configured to store various types of information required to operate the vehicle 10. For example, the storage 160 may be configured to store image data acquired by the camera 110, measurement values acquired by the bio-signal sensor 120, correlation information between the user's bio-signals and emotion factors, correlation information between factors, information regarding the emotional state of the user, information regarding the emotion model and the neural network, and the like. At this time, the data stored in the storage 160 may be transmitted to the controller 140.

The storage 160 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these. The storage 160 may be memory implemented as a separate chip, or the storage 160 and the processor may be integrated into a single chip.

Figure 2:
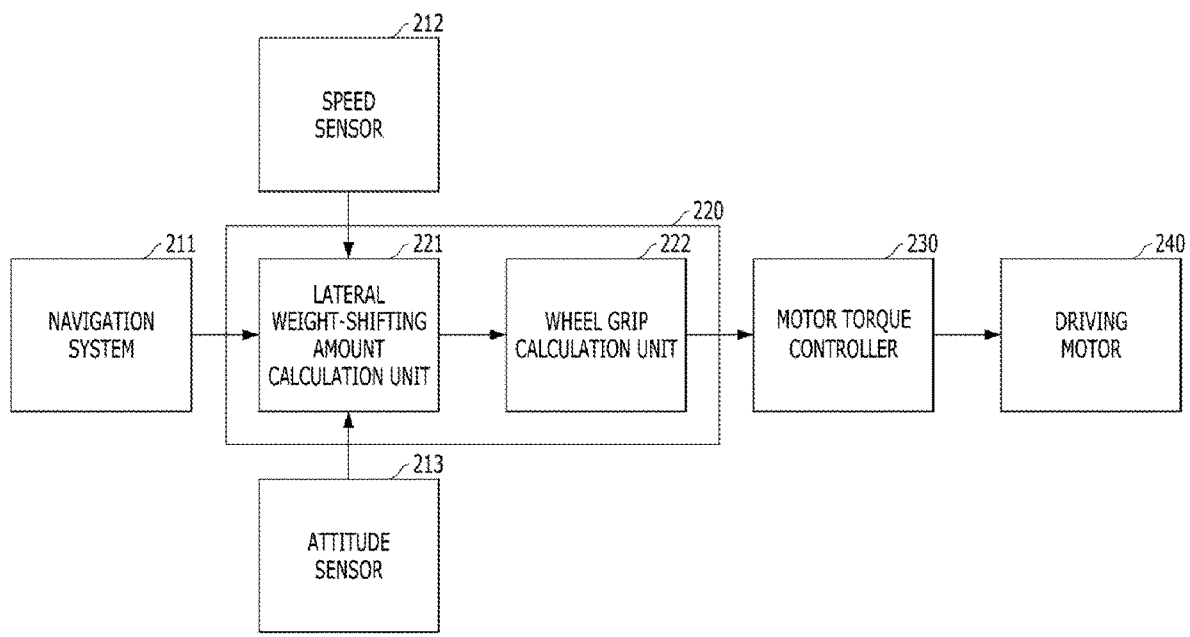
FIG. 2 is a view illustrating correlation information between bio-signals and emotion factors according to an exemplary embodiment of the disclosure.
Figure 3:
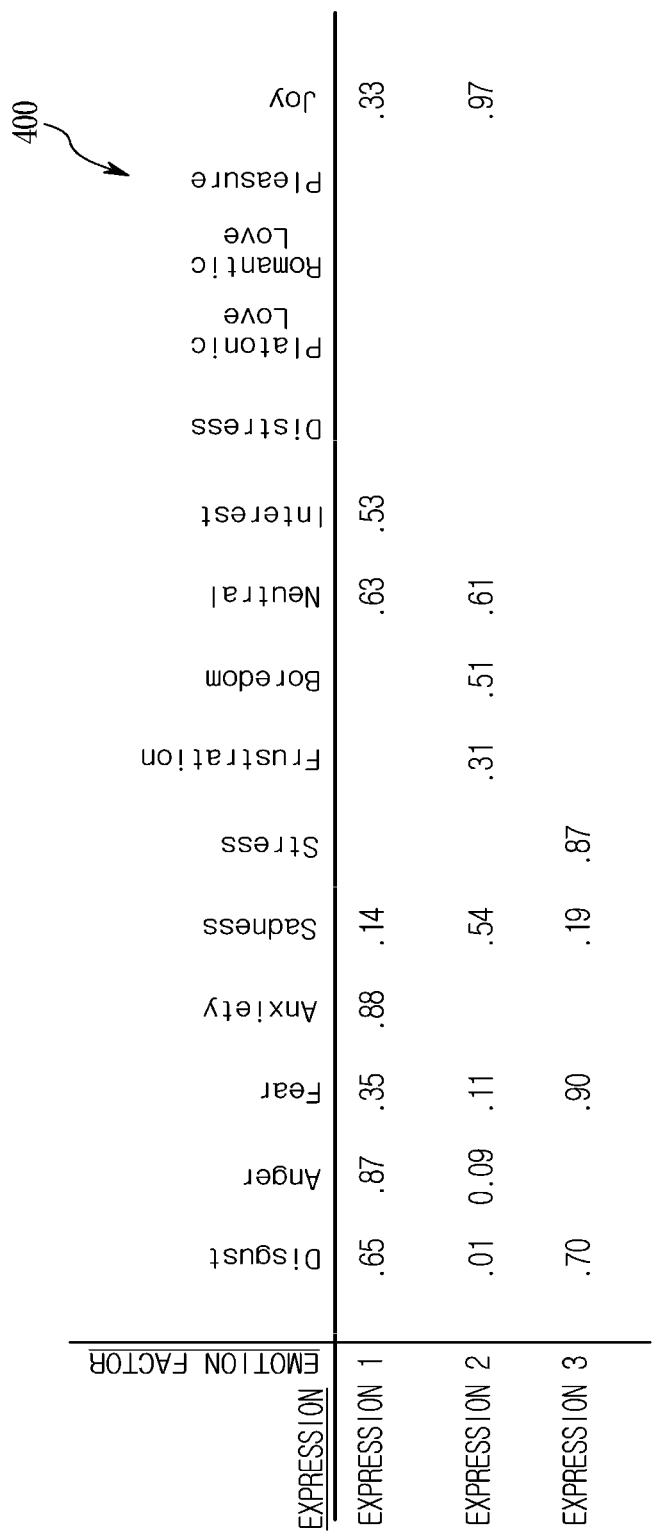
FIG. 3 is a view illustrating correlation information between facial expressions and emotion factors according to an exemplary embodiment of the disclosure.
Figure 4:
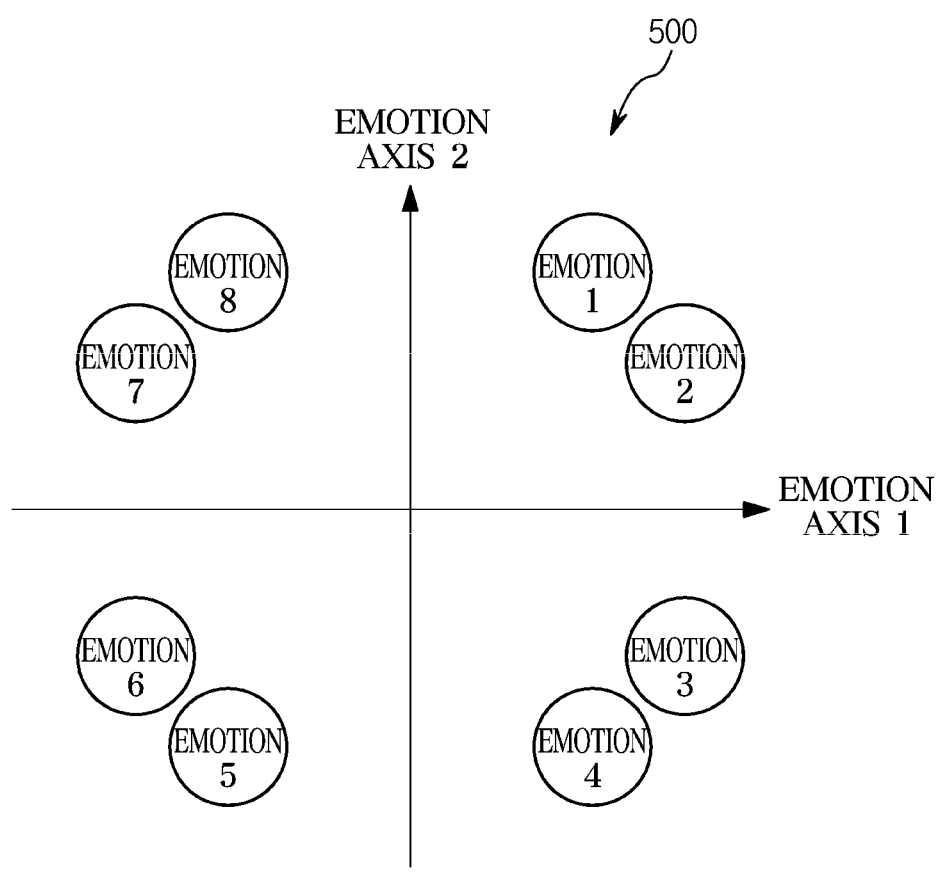
FIG. 4 is a view illustrating an emotion model according to an exemplary embodiment of the disclosure.

Hereinafter, the vehicle 10 for obtaining information regarding the user's emotional state based on the image data obtained by the vehicle 10 through the camera 110 and the bio-signals obtained through the bio-signal sensor 120 will be described in detail. FIG. 2 is a view illustrating correlation information between bio-signals and emotion factors according to an exemplary embodiment of the disclosure, FIG. 3 is a view illustrating correlation information between facial expressions and emotion factors according to an exemplary embodiment of the disclosure, and FIG. 4 is a view illustrating an emotion model according to exemplary an embodiment of the disclosure.

Referring to FIG. 2, correlation information 200 between the bio-signals and the emotion factors may include correlation information between the GSR and the EEG and emotion factors. As illustrated in FIG. 2, a GSR signal has correlation values of 0.875 and 0.775 with emotion factors of Disgust and Anger, respectively, which indicates that the GSR signal has a high relevance with the emotion factors of Disgust and Anger. Therefore, the bio-signals of the user collected by the GSR sensor may be the basis on which an emotion of the user is determined as an anger emotion or a disgust emotion.

An emotion factor of Joy has a relatively low correlation value of 0.353 with the GSR signal, which indicates that the emotion factor of Joy is less relevant to the GSR signal. An EEG signal has correlation values of 0.864 and 0.878 with emotion factors of Anger and Fear, respectively, which indicates that the EEG signal has a relatively higher relevance to the emotion factors of Anger and Fear than the other emotion factors. Therefore, the bio-signals collected by the EEG sensor may be the basis on which an emotion of the user is determined as an anger emotion or a fear emotion.

Accordingly, the controller 140 may be configured to obtain emotion information of each of the users using the correlation information 200 between the bio-signals and emotion factors. However, since the information illustrated in FIG. 2 is from experimental results, it may vary based on the experimental environment. Although correlation information between the GSR and the EEG and emotion factors is illustrated in FIG. 2, the correlation information 200 between the bio-signals and the emotion factors may include correlation information between different bio-signals and emotion factors depending on the types of bio-signals measured by sensors provided in the vehicle 10.

Referring to FIG. 3, the controller 140 according to an exemplary embodiment of the disclosure may be configured to recognize the facial expressions of each of the users appearing in the images of the users captured by the camera 110, and obtain the emotion information of the users by applying a facial action coding system (FACS) to the facial expressions of the users. More particularly, the controller 140 may be configured to extract a plurality of feature points from the face of the user, and extract a plurality of facial elements using the extracted feature points. The plurality of facial elements may include eyebrows, eyes, nose, mouth, and the like.

The controller 140 may then be configured to combine patterns of the plurality of facial elements, and compare the combined patterns with correlation information 300 between the facial expressions and emotion factors stored in the storage 160. The correlation information 300 between the facial expressions and emotion factors may correspond to information representing relationships between the facial expressions and emotions. The controller 140 may be configured to determine a facial expression that corresponds to the same pattern as or the most similar pattern to the combined pattern of the user in the correlation information 300 between the facial expressions and emotion factors, and determine the searched facial expression as the facial expression of the user.

In addition, the controller 140 may be configured to obtain emotion information representing the emotion of the user by considering a correlation value for the determined facial expression of the user in the correlation information 300 between the facial expressions and emotion factors. For example, when the determined facial expression of the user corresponds to a facial expression 2 in the correlation information 300 between the facial expressions and emotion factors, the controller 140 may be configured to obtain emotion information representing that the emotion of the user is a joy emotion having a highest correlation value for the facial expression 2.

In FIG. 3, the correlation information 300 between the facial expressions and emotion factors includes a facial expression 1, the facial expression 2, and a facial expression 3, however, the correlation information 300 may further include another facial expression that may represent the passenger's emotion. Accordingly, the controller 140 may be configured to analyze an image of the inside of the vehicle 10, photographed by the camera 110, to determine the facial expressions of each of the users in the vehicle 10 and to obtain emotion information of the users based on the determined facial expression.

Referring to FIG. 4, an emotion model 400 may be a graph illustrating emotions of the user classified according to the image data of the user and the bio-signals of the user. The emotion model 400 may classify the emotions of the user based on a predetermined emotion axes. The emotion axes may be determined based on emotions measured from the images of the user or from the bio-signals of the user. For example, emotional axis 1 may be degrees of positivity or negativity, which are measurable by the voices or the facial expressions of the user, and emotional axis 2 may be degrees of excitability or activity, which are measurable by the GSR or the EEG.

When the emotion of the user has a high degree of positivity and a high degree of excitability, the emotion may be classified to emotion 1 or emotion 2. Conversely, when the emotion of the user has minus (−) positivity, i.e., a high degree of negative and a high degree of excitability, the emotion may be classified to emotion 3 or emotion 4. The emotion model may be a Russell's emotion model. The Russell's emotion model may be expressed by a two-dimensional graph based on the x-axis and the y-axis, and may classify emotions to eight areas of joy (0 degrees), excitement (45 degrees), arousal (90 degrees), pain (135 degrees), unpleasantness (180 degrees), depression (225 degrees), sleepiness (270 degrees), and relaxation (315 degrees). In addition, the eight areas may be divided into a total of 28 emotions that are classified into similar emotions belonging to the eight areas.

Accordingly, the controller 140 may be configured to obtain the emotion information of each of the users using the facial expressions and the bio-signals of the users, the correlation information 200 between the bio-signals and emotion factors, the correlation information 300 between the facial expressions and emotion factors, and the emotion model 400. The obtained emotion information may be defined as numerical values for the degree of positivity and degree of excitability according to the degrees of emotions. Particularly, each degree of positivity and degree of excitability may be expressed numerically as a value between 0 and 100 depending on the degrees. However, the numerical values according to the degrees are merely an example, and may be included without limitation as long as it corresponds to numerical values that may represent the degrees.

Figure 5:
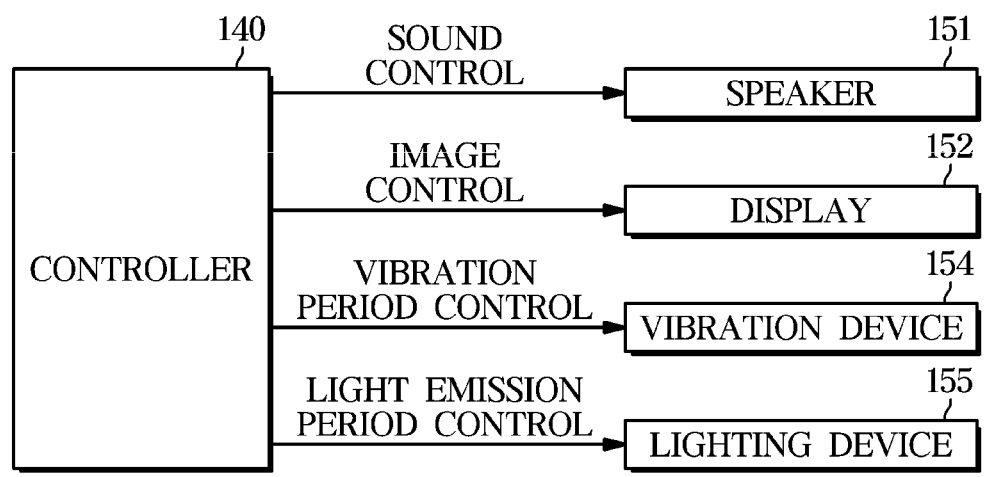
FIG. 5 is a view illustrating a unidirectional feedback control of a vehicle according to an exemplary embodiment.

FIG. 5 is a diagram illustrating a unidirectional feedback control of a vehicle according to an exemplary embodiment. Unlike the exemplary embodiments described below with reference to FIG. 6, the present exemplary embodiment allows the feedback device to output the current emotional state of the user instead of the control reflecting the changed emotional state of the user. In particular, controller 140 may be configured to adjust the output signal of the feedback device 150 based on the current emotional state of the user. At this time, the feedback device 150 may include various output devices, and the feedback device 150 may include the speaker 151, the display 152, the vibration device 154, and the lighting device 155.

The controller 140 may be configured to adjust the output signal to induce the target emotional state, which is an emotional state in which the degree of excitability of the user is reduced. Accordingly, the controller 140 may be configured to generate an output signal having an output frequency matched with the frequency of the bio-signal. The feedback device 150 may be configured to provide the output to the user in accordance with the generated output signal. The exemplary embodiment of the present invention may provide an effect of alleviating the user's stress and nausea by ventilating the user's feelings through the feedback device, which is a mediator.

As shown in FIG. 5, the controller 140 be configured to adjust the sound output from the speaker 151, the image output from the display 152, and the vibration generated in the vibration device 154, and the intensity and the wavelength of the light may be adjusted. The controller 140 in one exemplary embodiment may be configured to adjust the vibration period of the vibration device 154 to be matched to the user's bio-signals when the feedback device 150 is the vibration device 154 disposed on the seat of the vehicle. In particular, the vibration device 154 may be provided in various devices that may transmit the vibration of the vibration device 154 in contact with the user's body in addition to the seat of the vehicle.

The bio-signals capable of determining the vibration period of the vibration may correspond to one of the respiration or the pulse of the user. The controller 140 may be configured to adjust the sound period of the speaker 151 to be matched with the user's bio-signals when the feedback device 150 is the speaker 151 mounted within the vehicle 10. The controller 140 of the other exemplary embodiment may be configured to adjust at least one of the intensity of light of the lighting device 155, the wavelength of light, and the light period of the lighting device 155, to be output to be matched to the signal.

Figure 6:
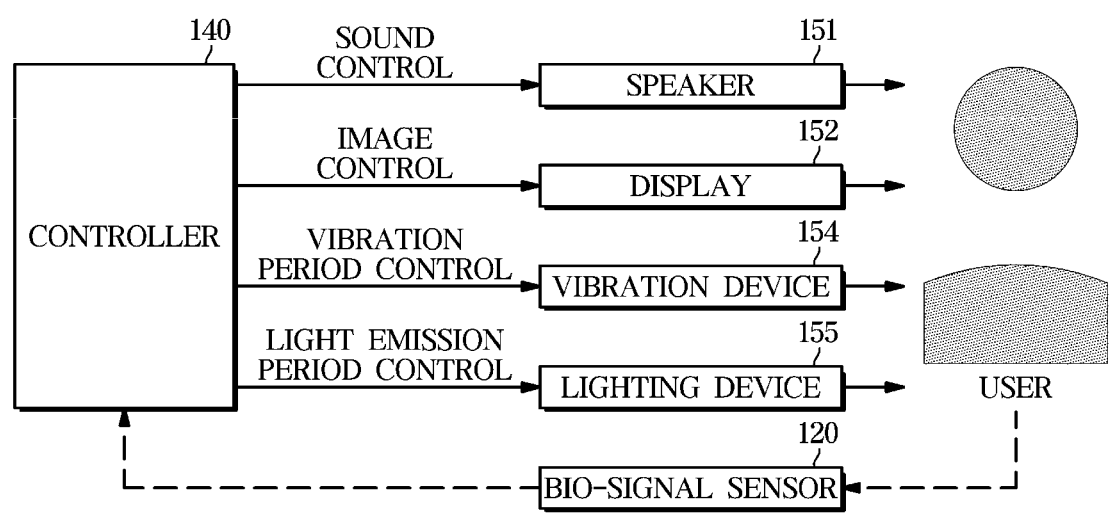
FIG. 6 is a view illustrating an interactive feedback control of a vehicle according to an exemplary embodiment.

FIG. 6 is a diagram illustrating an interactive feedback control of a vehicle according to an exemplary embodiment. The present exemplary embodiment allows the feedback device to reflect the changed emotional state of the user through interaction between the user and the feedback device, and the feedback device may change the emotional state of the user.

The controller 140 in one exemplary embodiment may be configured to adjust the vibration period of the vibration device 154 to be matched to the user's bio-signals when the feedback device 150 is the vibration device 154 provided on the seat of the vehicle. The controller 140 may be configured to adjust the generation of the vibration having the vibration period matched with the user's bio-signals by receiving the user's bio-signals from the bio-signal sensor 120 in real time. In addition, the controller 140 may be configured to adjust the generation of a vibration having a guide frequency for guiding the current user's bio-signals to a stable state.

Further, the controller 140 in the other exemplary embodiments may be configured to operate the feedback device 150 to output the sound signal of the speaker 151 mounted within the vehicle and the sound period of the speaker 151 to be matched with the user's bio-signals. The controller 140 may be configured to adjust the generation of a sound having a sound period matched to the user's bio-signals by receiving the user's bio-signals in real time. In addition, the controller 140 may be configured to operate the speaker 151 to generate a sound having a guide frequency for guiding the current user's bio-signals to a stable state.

Particularly, the speaker 151 may be interlocked with the display 152. The display 152 may be configured to output the first image and the second image. The first image may be an image interlocked with the target frequency and the second image may be an image interlocked with the guide frequency. An example of an output image is shown in FIG. 7. The controller 140 of the other exemplary embodiment may be configured to adjust the intensity of the light that induces the current bio signals of the user to be in a stable state, the wavelength of the light, and the light period. It may be possible to generate an output signal having at least one.

Figure 10:
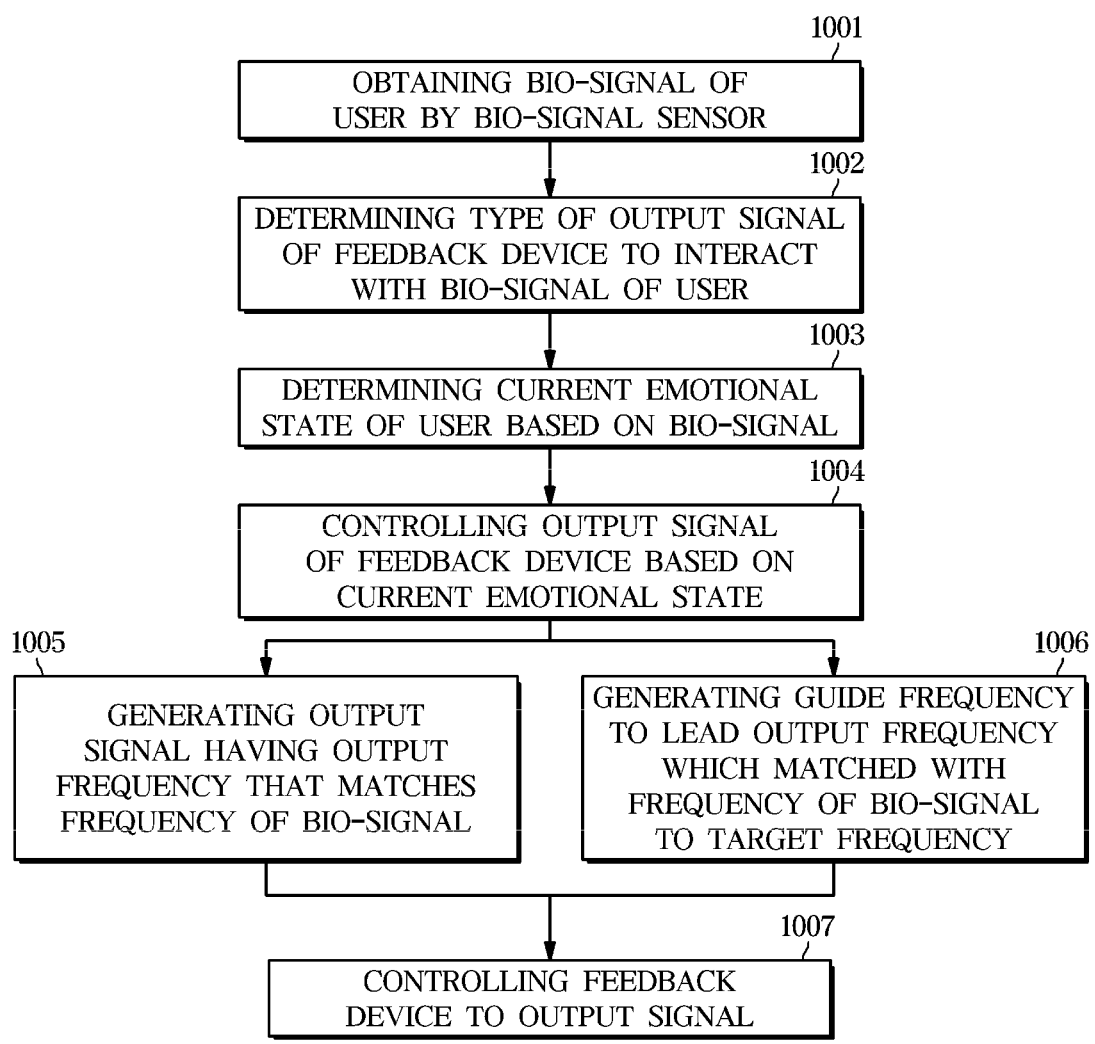
FIG. 10 is a flowchart of a method of controlling a vehicle according to an exemplary embodiment.

FIG. 10 is a flowchart of a method of controlling a vehicle according to an exemplary embodiment. However, it should be understood that the present invention is not limited thereto and that some steps may be added or deleted as needed. The controller 140 may be configured to obtain the bio-signals of the user (1001). At this time, the bio-signals indicate signals capable of determining the physical condition and the mental state of the user. For example, the bio-signals may be the respiration or the pulse of the user. Various sensors for obtaining the bio-signals are already described above.

The controller 140 may be configured to determine the type of the output device so that the user and the feedback device interact with each other (1002). In particular, the output device may include the feedback device 150, which refers to any device capable of outputting a five-sensory stimulus to the user. The controller 140 may be configured to determine the current emotional state of the user based on the user's bio-signals (1003). The specific method of determining the emotional state of the user is as described in FIGS. 2 to 4. When the controller 140 determines the current emotional state of the user in step 1003, the controller 140 may be configured to adjust the output signal of the feedback device 150 according to the determination result (1004). The control step may be divided into two types.

In one exemplary embodiment, the controller 140 may be configured to generate an output signal having an output frequency matching the frequency of the bio-signals, and the controller 140 may be configured to generate an output signal having an output frequency matched with the bio-signals of the user so that the bio-signals of the user may be simulated.

In another exemplary embodiment, the controller 140 may be configured to generate a guide frequency to guide the output frequency matching the frequency of the bio-signals to the target frequency as in step 1006. At this time, the controller 140 may lead the user to enter a stable emotional state by providing the output signal that corresponds to the guide frequency to the user. As described above, the controller 140 may be configured to operate the feedback device 150 to output the output signal.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all types of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure.

The above exemplary embodiments are only by way of example, and should not be interpreted in a limited sense.

What is claimed is:

1. A vehicle, comprising:
a bio-signal sensor that measures a bio-signal of a user;
a feedback device that interacts with the bio-signal of the user received by the bio-signal sensor, wherein the feedback device includes at least two of a vibration device disposed on a seat of the vehicle, a speaker mounted within the vehicle, a lighting device mounted within the vehicle, and an air conditioner mounted within the vehicle; and
a controller that determines a current emotional state of the user based on the bio-signal received by the bio-signal sensor and adjusts an output signal of the feedback device based on the current emotional state, wherein the output signal leads to a target emotional state in which a degree of excitability is a reduced emotional state,
wherein the controller controls the speaker to simultaneously output a first sound a second sound having a difference frequency band from the first sound to avoid acoustic interferences between the first sound and the second sound,
wherein the first sound includes a target frequency corresponding to a target breathing period or a target heartbeat period,
the second sound includes a guide frequency for guiding an output frequency matching frequency of the bio-signal of the user to the target frequency,
the target frequency is a frequency of the emotional state in which the degree of excitability of the user is reduced, and
the guide frequency has a constant value or a variable value that changes gradually.

2. The vehicle according to claim 1, wherein the bio-signal sensor senses at least one of a breathing state and a heartbeat state of the user.

3. The vehicle according to claim 1, wherein the controller adjusts the output frequency to determine a vibration period of the vibration device.

4. The vehicle according to claim 1, wherein the controller adjusts the output frequency to determine a sound period of the speaker.

5. The vehicle according to claim 1, wherein the controller adjusts the output frequency to determine a light emission period of the lighting device.

6. The vehicle according to claim 1, wherein the bio-signal sensor detects a heartbeat state and a breathing state of the user, the feedback device further includes a display, and the controller operates the display by adjusting the guide frequency, and leads the heartbeat state and the breathing state of the user.

7. The vehicle according to claim 6, further comprising:
a camera acquires image data for the user,
wherein the controller determines the current emotional state of the user based on at least one of the image data and the bio-signal of the user.

8. The vehicle according to claim 1, further comprising:
a display interlocked with the speaker,
wherein the display outputs a first image and a second image, and
wherein the first image is an image based on the target frequency and the second image is an image based on the guide frequency.

9. The vehicle according to claim 1, the controller adjusts the guide frequency to determine a light emission period of the lighting device.

10. A method for controlling a vehicle, comprising:
obtaining, by a controller, a bio-signal of a user using a bio-signal sensor;
determining, by the controller, a type of an output signal of a feedback device to interact with the bio-signal of the user, and a current emotional state of the user based on the bio-signal, wherein the feedback device includes at least two of a vibration device disposed on a seat of the vehicle, a speaker mounted within the vehicle, a lighting device mounted within the vehicle, and an air conditioner mounted within the vehicle;
adjusting, by the controller, the output signal of the feedback device based on the current emotional state;
transmitting, by the controller, the output signal to the feedback device for output, wherein the output signal leads to a target emotional state in which the degree of excitability is a reduced emotional state, wherein the adjusting of the output signal includes:

operating, by the controller, the feedback device to generate the output signal having an output frequency matched with a frequency of the bio-signal; and adjusting, by the controller, the output of a guide frequency for guiding an output frequency matched with the frequency of the bio-signal to a target frequency, controlling, by the controller, the speaker to simultaneously output a first sound and a second sound having a different frequency band from the first sound to avoid acoustic interference between the first sound and the second sound, wherein the first sound includes a target frequency corresponding to a target breathing period or a target heartbeat period, the second sound includes a guide frequency for guiding an output frequency matching frequency of the bio-signal of the user to the target frequency, the target frequency is a frequency of the emotional state in which the degree of excitability of the user is reduced, and the guide frequency has a constant value or a variable value that changes gradually.

11. The method according to claim 10, wherein the adjusting of the output signal includes:

adjusting, by the controller, the output frequency to determine a sound period of the speaker.

12. The method according to claim 10, wherein the adjusting of the output signal includes:

adjusting, by the controller, the output frequency to determine a light emission period of the lighting device.

13. The method according to claim 10, further comprising:

adjusting, by the controller, the guide frequency to determine a vibration period of the vibration device.

14. The method according to claim 10, wherein the vehicle further includes a display interlocked with a speaker and the adjusting of the output signal includes:

operating, by the controller, the display of a first image and a second image, wherein the first image is an image based on the target frequency and the second image is an image based on the guide frequency.

15. The method according to claim 10, further comprising:

adjusting, by the controller, the guide frequency to determine a light emission period of the lighting device.

16. The method according to claim 10, wherein the vehicle further includes a camera configured to acquire image data for the user and the obtaining of the bio-signal of the user by the bio-signal sensor includes:

determining, by the controller, the current emotional state of the user based on at least one of the image data and the bio-signal of the user.

* * * * *